United States Patent [19]

Ninomiya et al.

[11] Patent Number: 5,790,442
[45] Date of Patent: Aug. 4, 1998

[54] METHOD AND APPARATUS FOR GENERATING LOW-DISCREPANCY SEQUENCE, AS WELL AS APPARATUS AND METHOD FOR CALCULATING MULTIPLE INTEGRAL OF FUNCTION F

[75] Inventors: Syoiti Ninomiya, Tokyo-to; Shu Tezuka, Yokohama, both of Japan

[73] Assignee: International Business Machines Corporation, Armonk, N.Y.

[21] Appl. No.: 614,597

[22] Filed: Mar. 13, 1996

[30] Foreign Application Priority Data

Mar. 14, 1995 [JP] Japan ................... 7-054143

[51] Int. Cl.⁶ .......................................... G06F 7/38
[52] U.S. Cl. ............................................. 364/733
[58] Field of Search ..................... 364/733, 736.01, 364/716.02, 718.01

[56] References Cited

U.S. PATENT DOCUMENTS 5,031,134  7/1991  Kaplan et al. ..................... 364/733

*Primary Examiner*—Tan V. Mai

*Attorney, Agent, or Firm*—Norman L. Gundel

[57] ABSTRACT

A method and system are provided for generating a low-discrepancy sequence at high speed, comprising means for expanding an i-th coordinate value $u_n^{(i)}$ ($1 \leq i \leq k$) of an n-th element of the low-discrepancy sequence ($u_n^i, \ldots, u_n^{(k)}$) in b scale, and storing m components created by the expansion of each value in sequence into a first storage means, wherein the above n is an integer equal to or more than 1 and the above b is a prime number equal to or more than k; means for expanding the number n in b scale, and storing the created expansion ($n_m, n_{m-1}, \ldots, n_1$) in sequence into a second storage means; means for scanning the second storage means in sequence, and detecting a minimum order j wherein nj is not equal to b−1; and means, respondent to the means for scanning, for reading out j-th row components of a low-discrepancy generator matrix $T^{(i)}$ stored in advance for an i-th coordinate value ($1 \leq i \leq k$) of the element of the low-discrepancy sequence and the components created by the expansion of the i-th coordinate value of the element of the low-discrepancy sequence in sequence, and adding the j-th row components to the components created by said expansion read out in the same order in modulo b, and storing the result of the addition in sequence into a third storage means.

17 Claims, 5 Drawing Sheets

METHOD AND APPARATUS FOR GENERATING LOW-DISCREPANCY SEQUENCE, AS WELL AS APPARATUS AND METHOD FOR CALCULATING MULTIPLE INTEGRAL OF FUNCTION F

BACKGROUND OF THE INVENTION

1. Field of the Invention

This present invention refers to a method and system for generating a generalized Faure sequence and a low-discrepancy sequence called a Faure sequence at a high speed. This low-discrepancy sequence is a extremely uniform distribution sequence of points.

2. Description of the Related Art

With the recent trend of liberalization of interest rates, various financial institutions, such as banks or securities corporations, have come to make the most of a high speed computer for pricing a derivative security and like purposes. The reason for using a high speed computer is the necessity of promptly meeting the demand of customers in spite of a great many factors of fluctuation such as various customer-dependent parameters and economic indicators.

As a field of providing a mathematical model for such finances and giving an algorithm for rationally solving an equation in the mathematical model, a financial engineering is proposed and has recently formed an active study.

Calculations required for the financial engineering, especially for pricing a derivative security include a multiple integration. Generally, for computer-used integration, a technique of equipartitioning the integral interval into an infinitesimal regions and accumulating the product of a value of function in each subinterval and a width of subinterval is used. In a multiple integral calculation, however, a k-fold multiple integral requires an $N^k$ iteration of calculation for N partitions in one integral interval. Even for k=5, a computational time with a practical number N of partitions exceeds the practicable limits for processing with an ordinary computer.

For this reason, a method for calculating a multiple integral, called a Monte Carlo method by use of a certain type of random numbers has so far been proposed. This method comprises the steps of: generating a plenty of k-dimensional coordinates uniformly random within the limits of k-dimensional integral intervals for a multiple integral; successively substituting the generated coordinates in the function to be integrated; and evaluating the probability of the substituted values to satisfy a predetermined condition.

This is expressed with the following formula:

$$\int_{[0,1]^k} f(x)dx = \frac{1}{N} \sum_{i=1}^{N} f(x_i)$$

In this case, to give a set of N points $x_i$, i=1, ..., N is the algorithm itself. For calculating the expected value of prices in pricing a derivative security, a f(x) determined from each stochastic model is used.

In addition, in this type of problems, an algorithm serving to reduce an error in integral is a "good algorithm". On the other hand, from a consideration with the error kept constant (e.g., 0.001), a "good algorithm" is one in which the target error can be attained by using a set of the fewest possible points (i.e., the minimum N). Since the computational time is generally proportional to the number of points in such an algorithm, a "good algorithm" also means a "rapid algorithm".

In the Monte Carlo method in which random points generated by a linear congruence method are used, it is known that the error is almost proportional to an inverse number of the square root of N. Following this, $10^6$ points are required for attaining an error of 0.001.

On the other hand, there is also an algorithm with a low-discrepancy sequence used as a set of N points. In this case, it is known that the error is theoretically proportional to 1/N. According to this, points of $N=10^3$ are enough for attaining an error of 0.001. Accordingly, using a low-discrepancy sequence enable a $10^3$ times faster computation than that of the Monte Carlo.

Some methods for forming a low-discrepancy sequence are proposed, but a sequence called a Faure sequence is regarded as promising for calculating a high-dimensioned multiple integral by those skilled in the art. For further details, refer to the following treatise: P. P. Boyle, New Variance Reduction Methods for Efficient Monte Carlo Simulations. Conference on Advanced Mathematics on Derivatives, RISK Magazine (September, 1994).

Furthermore, as an algorithm of this sequence, a technique described in the following treatise is known and currently used.

P. Bratley, B. L. Fox, and H. Niederreiter, Implementation and Tests of Low-Discrepancy Sequences, ACM Trans. Modeling and Computer Simulation, 2, (July, 1992), 195-213.

In accordance with experiments by the present inventor, however, generating a Faure sequence by the method described in this paper takes, in fact, 60 times longer time than that of the linear congruence method.

Especially in a calculation for pricing a derivative security, calculating a multiple integral by using a low-discrepancy sequence achieves theoretically about 100 times the speed achieved by using an ordinary Monte Carlo method in some cases, but only on assumption that the time taken for generating one point is almost identical between the low-discrepancy method and the linear congruence method by the Monte Carlo method. If generating a Faure sequence takes 60 times the time taken for generating a random sequence of the linear congruence method, the benefit from using a low-discrepancy is reduced to a great extent.

It is one object of the present invention to provide a method and system for generating a Faure sequence at high speed.

It is another object of the present invention to highly speed up the calculation of a multiple integral used for pricing a derivative security and for the like by using the Faure sequence thus generated.

SUMMARY OF THE INVENTION

In accordance with the present invention, a conventional sequence $X_n=Tv_n$ is replaced with $Y_n=TGv_n$, where the G is a square matrix in which all diagonal components are 1, ij components are −1 for j−i=1 and the other components are 0.

Then, according to a non-obvious knowledge on the present invention, an n+1-th element of the low-discrepancy sequence is evaluated by determining the minimum j in a vector $v_n$ whose components consist of the b scale expansion of number n wherein $n_j$ is not equal to b−1, and adding the j-th row of the generator matrix T and the n-th element of the low-discrepancy sequence in modulo b. At this time, since addition alone is substantially required, a low-discrepancy can be evaluated at a high speed with a by far smaller amount of calculations than that of a method requiring the mutual multiplication of all matrix components between the matrices.

Also, performing the calculations in a plurality of processors can provide a higher-speed system and method. This is based on the use of the property of the above matrix G, and an element of the low-discrepancy sequence $Y_n$ in any order can be created from $Y_n=TGv_n$ for a given n. Using this relation, when the number s for the processing in each processor is given to a plurality of processors, each processor generates $Y_s$ for the number s. If $Y_s$ is created, $Y_{s+1}$ can be created in the above way of addition without multiplication. Thus, if each processor generates low-discrepancy sequences from $Y_{s+1}$ to $Y_t$ by iterating the processing wherein the number t corresponds to a processing terminate number in each processor, the low-discrepancy sequences can be created at a higher speed as the whole system. However, when applying this parallel processing to the calculation of a multiple integral, there is no large difference in processing time for some integrands whether in a way of addition following $Y_{n+1}=Y_n ADD_b Te_j$ without using a multiplication or in a way of using the above multiplication and therefore the latter way may be used in this case for generating the low-discrepancy sequences from $Y_{s+1}$ to $Y_t$ in each processor.

More concretely, the present invention comprises as follows:

That is, an apparatus for generating a low-discrepancy sequence, comprises: (a) means for expanding a value of n-th element of said low-discrepancy sequence Yn in b scale and storing m components created by the expansion into a first storage means in sequence wherein the above n is an integer equal to or more than 1 and the above b is a prime number equal to or more than 2; (b) means for expanding the number n in b scale, and storing the created expansion ($n_m$, $n_{m-1}$, . . . , $n_1$) in sequence into a second storage means; (c) means for scanning the second storage means in sequence and detecting a minimum order j wherein $n_j$ is not equal to b−1; (d) means in response to the means (c) for reading out j-th row components of a low-discrepancy sequence generator matrix T stored in advance and components of the low-discrepancy sequence {Yn} stored in the first storage means in sequence, adding the j-th row components of the generator matrix T and the components of the n-th element of the low-discrepancy sequence {Yn} read out in the same order in modulo b, and storing the results of the addition in sequence into a third storage means. Thus, the present invention solves the technical problem of a time-consuming matrix multiplication and can provide an apparatus for the high-speed generation of a low-discrepancy sequence to be used in a computer.

As another arrangement of the present invention, an apparatus for generating a low-discrepancy sequence comprises: (a) means for expanding an i-th coordinate value $u_n^{(i)}$ ($1 \leq i \leq k$) of an n-th element of the low-discrepancy sequence ($u_n^{(1)}$, . . . , $u_n^{(k)}$) in b scale, and storing m components created by the expansion of each value in sequence into a first storage means, wherein the above n is an integer equal to or more than 1 and the above b is a prime number equal to or more than k; (b) means for expanding the number n in b scale, and storing the created expansion ($n_m$, $n_{m-1}$, . . . , $n_1$) in sequence into a second storage means; (c) means for scanning the second storage means in sequence, and detecting a minimum order j wherein $n_j$ is not equal to b−1; (d) means in response to the means (c) for reading out j-th row components of a generator matrix $T^{(i)}$ stored in advance for an i-th coordinate value ($1 \leq i \leq k$) of the low-discrepancy sequence and the components created by the expansion of the i-th coordinate value of the n-th element of the low-discrepancy sequence in sequence, and adding the j-th row components and the components created by the expansion read out in the same order in modulo b, and storing the result of the addition in sequence into a third storage means.

If applied to a multiple integral of a function f as described above, an apparatus for generating a low-discrepancy sequence becomes the following apparatus for calculating a multiple integral of function f; that is, an apparatus comprising: (a) means for defining a function $f(x_1, x_2, \ldots, x_k)$ related to k elements; (b) means for expanding an i-th coordinate value $u_n^{(i)}$ ($1 \leq i \leq k$) of an n-th element of the low-discrepancy sequence ($u_n^{(1)}$, . . . , $u_n^{(k)}$) in b scale, and storing m components created by the expansion of each value in sequence into a first storage means, wherein the above n is an integer equal to or more than 1 and the above b is a prime number equal to or more than k; (c) means for expanding the number n in b scale, and storing the created expansion ($n_m$, $n_{m-1}$, . . . , $n_1$) in sequence into a second storage means; (d) means for scanning the second storage means in sequence, and detecting a minimum order j wherein $n_j$ is not equal to b−1; (e) means in response to the means (d) for reading out j-th row components of a generator matrix $T^{(i)}$ stored in advance for an i-th coordinate value ($1 \leq i \leq k$) of the low-discrepancy sequence and the components created by the expansion of the i-th coordinate value of the n-th element of the low-discrepancy sequence in sequence, and adding the j-th row components and the components created by the expansion read out in the same order in modulo b, and storing the results of the addition in sequence into a third storage means; (f) means for inverted-expanding the m results of the addition in b scale, and storing the created value $u_{n+1}^{(i)}$ into the fourth storage means; (g) means for calculating a value of $f(u_{n+1}^{(1)}, \ldots, u_{n+1}^{(k)})$ if the means (f) stores a coordinate value $u_{n+1}^{(i)}$ ($1 \leq i \leq k$) into a fourth storage means; (h) means for controlling the means (b) to (g) so as to accumulate a value of generated $f(u_{n+1}^{(1)}, \ldots, u_{n+1}^{(k)})$ from n=1 to n=N, wherein the N is a predetermined integer greater than 1; and (i) means in response to the means (h) for dividing the accumulated value by N. In this way, an integral value is evaluated at high speed.

Furthermore, if applied to a parallel processing as mentioned above, the above apparatus for generating a low-discrepancy sequence becomes the following system; that is, a system for generating a low-discrepancy sequence, comprising: a plurality of processors; and means for transmitting processing assignment information including a processing start number s to each of the processors; wherein each processor comprising: (a) means for receiving the processing assignment information, and creating an element of the low-discrepancy sequence ($u_s^{(1)}, \ldots, u_s^{(k)}$) corresponding to the processing start number s, and storing the created low-discrepancy sequence into a first storage means; (b) means for expanding an i-th coordinate value $u_n^{(i)}$ ($1 \leq i \leq k$) of an n-th element of the low-discrepancy sequence ($u_n^{(1)}, \ldots, u_n^{(k)}$) in b scale, and storing m components created by the expansion of each value in sequence into a second storage means, wherein the b is a prime number equal to or more than k; (c) means for expanding the number n in b scale, and storing the created expansion ($n_m$, $n_{m-1}$, . . . , $n_1$) in sequence into a third storage means; (d) means for scanning the third storage means in sequence, and detecting a minimum order j wherein $n_j$ is not equal to b−1; (e) means in response to the means (d) for reading out j-th row components of a generator matrix $T^{(i)}$ stored in advance for an i-th coordinate value ($1 \leq i \leq k$) of the low-discrepancy sequence and the components created by the expansion of the i-th coordinate value of the n-th element of the low-discrepancy sequence in sequence, and adding the j-th row components and the components created by the expansion read out in the same order in modulo b, and storing the results of the addition in sequence into a fourth storage means; (f) means for inverted-expanding the m results of the addition in b scale, and storing the created value $u_{n+1}^{(i)}$ into the first storage means; and (g) means for controlling the means (b) to (f) so as to store the low-discrepancy sequence from s+1-th element to t-th element into the first storage means, wherein the t corresponds to a processing terminate number in the relevant processor, and the s+1-th element of the low-discrepancy sequence is $(u_{s+1}^{(1)}, \ldots, u_{s+1}^{(k)})$, and the t-th element of the low-discrepancy sequence is $(u_t^{(1)}, \ldots, u_t^{(k)})$. Thus, the total amount of calculations in individual processors naturally reduces by the number of processors, thereby leading to a speedier calculation.

It is thinkable that the means (a) in each processor of this system for generating a low-discrepancy sequence is arranged to include means for generating the i-th coordinate value $u_n^{(i)}$ of an n-th element of the discrepancy sequence by calculating a b scale expansion $(n_m, n_{m-1}, \ldots, n_1)$ of the number n and using the vector $v_n$ generated from the calculation result and generator matrix $T^{(i)}$ ($1 \leq i \leq k$) and a matrix G (shown in Expression 1 or the like).

When performing a multiple integral of a function f, this parallel processing proceeds as follows: A system for calculating a multiple integral of a function f, comprises: a plurality of processors; and system control means for transmitting a function $f(x_1, x_2, \ldots, x_k)$ related to k elements and processing assignment information including a processing start number s to each of the processors; and each processor comprises: (a) means for receiving the processing assignment information, and creating the element of the low-discrepancy sequence corresponding to the processing start number s $(u_s^{(1)}, \ldots, u_s^{(k)})$, and storing the created low-discrepancy sequence into a first storage means; (b) means for expanding an i-th coordinate value $u_n^{(i)}$ ($1 \leq i \leq k$) of an n-th element of the low-discrepancy sequence $(u_n^{(1)}, \ldots, u_n^{(k)})$ in b scale, and storing m components created by the expansion of each value in sequence into a second storage means, wherein the b is a prime number equal to or more than k; (c) means for expanding the number n in b scale, and storing the created expansion $(n_m, n_{m-1}, \ldots, n_1)$ in sequence into a third storage means; (d) means for scanning the third storage means in sequence, and detecting a minimum order j wherein $n_j$ is not equal to b−1; (e) means in response to the means (d) for reading out j-th row components of a generator matrix $T^{(i)}$ stored in advance for an i-th coordinate value ($1 \leq i \leq k$) of the low-discrepancy sequence and the components created by the expansion of the i-th coordinate value of the n-th element of the low-discrepancy sequence in sequence, and adding the j-th row components and the components created by the expansion read out in the same order in modulo b, and storing the results of the addition in sequence into a fourth storage means; (f) means for inverted-expanding the m results of the addition, and storing the created value $u_{n+1}^{(i)}$ into the first storage means; (g) means for controlling the means (b) to (f) so as to store the low-discrepancy sequence from the s+1-th element to the t-th element into the first storage means, wherein the t corresponds to a processing terminate number in the relevant processor, and the s+1-th element of the low-discrepancy sequence is $(u_{s+1}^{(1)}, \ldots, u_{s+1}^{(k)})$, and the t-th element of the low-discrepancy sequence is $(u_t^{(1)}, \ldots, u_t^{(k)})$; (h) means for receiving the function f, and reading out the n-th element of the low-discrepancy sequence $(u_n^{(1)}, \ldots, u_n^{(k)})$ ($s \leq n \leq t$) stored in the first storage means, and calculating a value of $f(u_n^{(1)}, \ldots, u_n^{(k)})$; (i) means for accumulating the created values of function $f(u_n^{(1)}, \ldots, u_n^{(k)})$ ($s \leq n \leq t$); and (j) means for transmitting the accumulated values by the means (i) to the system control means; while the system control means accumulates the value transmitted from each processor and divides the accumulated value by the number of the created low-discrepancy sequences for all processors. Because of a high-speed generation of low-discrepancy sequences, a more effective speed of calculations can be obtained when the integrand is a simple function. Naturally, even if the function f is not simple, the speediness of calculations based on the parallelism is maintained.

It is also thinkable that the means (a) in each processor of this computer system is arranged to include means for generating an i-th coordinate value $u_n^{(i)}$ of an n-th element of the discrepancy sequence by calculating a b scale expansion $(n_m, n_{m-1}, \ldots, n_1)$ of the number n and using the vector $v_n$ generated from the calculation result and generator matrix $T^{(i)}$ ($1 \leq i \leq k$) and a matrix G.

A still another arrangement of apparatus for generating a low-discrepancy sequence in a parallel processing is a system comprising: a plurality of processors; and means for transmitting processing assignment information including a processing start number s to each of the processors; wherein each processor comprises: (a) means for receiving the processing assignment information; (b) means for calculating a b scale expansion of the number n $(n_m, n_{m-1}, \ldots, n_1)$, and generating the i-th coordinate value $u_n^{(i)}$ of an n-th element of the low-discrepancy sequence by using the vector $v_n$ generated from the calculation result and a generator matrix $T^{(i)}$ ($1 \leq i \leq k$) and a matrix G; and (c) control means for inputting the number n ($s \leq n \leq t$) and the generator matrix $T^{(i)}$ ($1 \leq i \leq k$) and the matrix G to the means (b) so that the means (b) generates a low-discrepancy sequence from the s-th element to the t-th element, wherein the s corresponds to a processing start number, and the t corresponds to a processing terminate number in the relevant processor, and s-th element of the low-discrepancy sequence is $(u_s^{(1)}, \ldots, u_s^{(k)})$, and t-th element of the low-discrepancy sequence is $(u_t^{(1)}, \ldots, u_t^{(k)})$.

In the present invention, a low-discrepancy sequence comes to be calculated slow in comparison with the apparatus mentioned before for generating a low-discrepancy sequence, but a sufficient speed of calculations can be obtained on account of a parallel processing, say, if the integrand f is complicated and takes much time to be estimated in a later calculation for a multiple integral.

The above-mentioned system for generating a low-discrepancy sequence in a parallel processing is common in the following point; that is, in comprising: a plurality of processors; and means for transmitting a number n necessary for processing to each of the processors; wherein each processor comprises: (a) means for receiving the number n; and (b) means for calculating a b scale expansion of the number n $(n_m, n_{m-1}, \ldots, n_1)$, and generating the n-th element of the low-discrepancy sequence $Y_n$ by using the vector vn generated from the calculation result and a generator matrix T stored in advance and a matrix G.

Meanwhile, when not excluding the multiplication of matrices in a processing for generating a low-discrepancy sequence in each processor, an arrangement is thinkable for calculating a multiple integral of a function f which comprises: a plurality of processors; and system control means for transmitting a function $f(x_1, x_2, \ldots, x_k)$ related to k elements and processing assignment information including a processing start number s to each of the processors; wherein each processor comprises: (a) means for receiving the processing assignment information; (b) means for calculating a b scale expansion of the number n ($n_m, n_{m-1}, \ldots, n_1$), creating an i-th coordinate value $u_n^{(i)}$ of an n-th element of the low-discrepancy sequence by using the vector $v_n$ generated from the calculation result and a generator matrix $T^{(i)}$ ($1 \leq i \leq k$) and a matrix G, and storing the i-th value into storage means; (c) control means for inputting the number n ($s \leq n \leq t$) and the generator matrix $T^{(i)}$ ($1 \leq i \leq k$) and the matrix G to the means (b) so that the means (b) generates a low-discrepancy sequence from the s-th element to the t-th element, wherein the s corresponds to a processing start number, and the t corresponds to a processing terminate number in the relevant processor, and the s-th element of the low-discrepancy sequence is ($u_s^{(1)}, \ldots, u_n^{(k)}$), and the t-th element of the low-discrepancy sequence is ($u_t^{(1)}, \ldots, u_t^{(k)}$); (d) means for receiving the function f, and when the element of the low-discrepancy sequence ($u_n^{(1)}, \ldots, u_n^{(k)}$) is stored in the storage means, reading out each value $u_n^{(i)}$ and calculating a value of $f(u_n^{(1)}, \ldots, u_n^{(k)})$; (e) means for accumulating the created values of function $f(u_n^{(1)}, \ldots, u_n^{(k)})$ ($s \leq n \leq t$); and (f) means for transmitting the values accumulated by the means (e) to the system control means; while the system control means accumulates the values transmitted from each processor and divides the accumulated value by the number of the created low-discrepancy sequences for all processors.

BRIEF DESCRIPTION OF THE DRAWINGS:

The novel features believed characteristic of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

Figure 1:
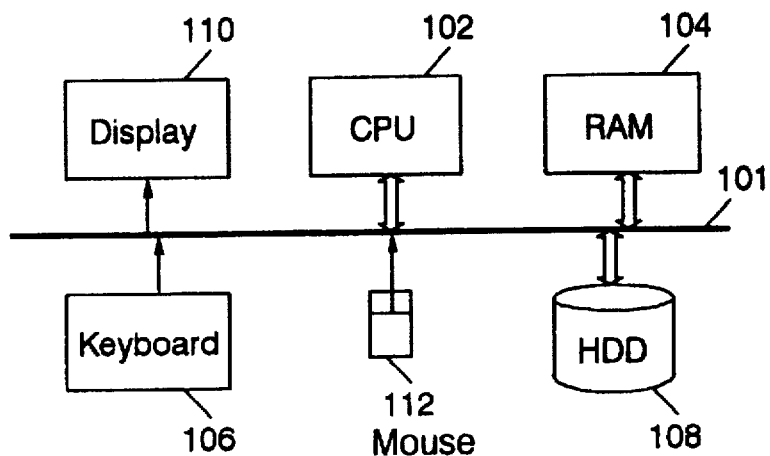
FIG. 1 is a block diagram showing hardware for implementing the present invention.

While the invention will be described in connection with a preferred embodiment, it will be understood that the description is not intended to limit the invention to that embodiment. On the contrary, the invention is intended to cover all alternatives, modifications and equivalents as may be included within the spirit and scope of the invention as described by the appended claims.

DESCRIPTION OF THE PREFERRED EMBODIMENTS

Principle of the Invention

Hereinafter, description will be performed for convenience in one dimension. However, this can be easily extended to k dimension as described later.

Express a sequence in $X_n$, $n=0, 1, 2, \ldots, b^{m}-1$, where b is a prime number equal to or greater than the dimension k and m is normally an integer near to $\log_b 2^{30}$. By definition, the sequence $X_n$ can be written as $X_n = Tv_n$ by using a generation matrix $T=(c_{ij})$. As for selecting such a matrix T, refer to the above-mentioned treatise by P. Bratley et al. Here, the vector $V_n$ corresponds to a b scale representation of the integer n $n = n_m b^{m-1} + \ldots n_2 b + n_1$ in terms of $t(n_1, \ldots, n_m)$.

Theorem

Let $e_j$, $j=1, 2, \ldots, m$ be a j-th unit vector with the length of m. Then, setting $g_n = Gv_n$, $g_{n+1} = g_n \text{ ADD}_b \, e_j$ holds.

Here, $\text{ADD}_b$ represents adding in modulo b for each coordinate, and j is the minimum index meeting $n_j \neq b-1$ in a vector $v_n = (n_1, \ldots, n_m)$.

Proof

Try to examine how the b scale expression of integer n varies when n turns into n+1. For example, setting b=3, assume n changes from 8 to 9.

Since $8 = 2*3+2$, the 3 scale expression of 8 is (022). Accordingly, a vector $v_8$ is expressed as follows:

$$v_8 = \begin{bmatrix} 2 \\ 2 \\ 0 \end{bmatrix}$$

And, since $9 = 3^2$, the 3 scale expression of 9 is (100). Accordingly, a vector $v_9$ is expressed as follows:

Since a multiplication of matrices $X_n = Tv_n$ was carried out as it is in the above-mentioned treatise by P. Bratley et al, a very large amount of time was taken for calculation.

On the other hand, according to the present invention, a sequence $Y_n$ is created by using $Y_n = TGv_n$ instead of direct multiplication of matrices in $X_n = Tv_n$. The sequence $Y_n$ is $Y_n$, $n=0, 1, \ldots, b^m-1$ and b is a prime number equal to or greater than the dimension k as well. Here, the matrix G is a sparse matrix in which all diagonal elements ii (i=1, ..., m) are 1, the right elements adjacent thereto ij (j−1=i, $1 \leq i \leq m$, $1 \leq j \leq m$) are −1, and the other elements are 0. Such a matrix G is regular and accordingly $Y_n$ itself is at once found to be a low-discrepancy sequence:

$$G = \begin{bmatrix} 1 & -1 & & & \\ & 1 & -1 & & \\ & & \ldots & & \\ & & & 1 & -1 \\ & & & & 1 \end{bmatrix} \pmod{b}$$

Hereupon, the present inventor has very non-trivially got to an idea that the following theorem holds:

$$v_9 = \begin{bmatrix} 0 \\ 0 \\ 1 \end{bmatrix}$$

Thus, using a 3×3 matrix G, $g_8$ and $g_9$ are calculated respectively as follows:

$$g_8 = \begin{bmatrix} 1 & -1 & 0 \\ 0 & 1 & -1 \\ 0 & 0 & 1 \end{bmatrix} \begin{bmatrix} 2 \\ 2 \\ 0 \end{bmatrix} \pmod{3} = \begin{bmatrix} 0 \\ 2 \\ 0 \end{bmatrix}$$

$$g_9 = \begin{bmatrix} 1 & -1 & 0 \\ 0 & 1 & -1 \\ 0 & 0 & 1 \end{bmatrix} \begin{bmatrix} 0 \\ 0 \\ 1 \end{bmatrix} \pmod{3} = \begin{bmatrix} 0 \\ 2 \\ 1 \end{bmatrix}$$

on the other hand, in the 3 scale expression (022) of 8, the minimum index meeting $n_j \neq 3-1=2$ is $j=3$. So, calculating $g_8$ $ADD_3$ $e_3$ results in $$g_8 ADD_3 e_3 = \begin{bmatrix} 0 \\ 2 \\ 0 \end{bmatrix} ADD_3 \begin{bmatrix} 0 \\ 0 \\ 1 \end{bmatrix} = \begin{bmatrix} 1 \\ 2 \\ 1 \end{bmatrix} = g_9$$

and consequently it is found that $g_8 ADD_3 e_3$ agrees with $g_9$. The generalized proof can be established for any b by using the mathematical induction concerning n.

When such an expression $g_{n+1}=g_n$ $ADD_b$ $e_j$ holds, a matrix T is multiplied to both sides from the left and then $Y_{n+1}=Y_n$ $ADD_b$ $Te_j$ is obtained because $g_n=Gv_n$ and $Y_n=TGv_n$. However, since $Te_j$ is just the j-th row components of a matrix T, $Y_{n+1}$ is evaluated only by adding the j-th row components of a matrix T to Yn in modulo b. At this time, although a value of j must be also determined, it is only necessary for finding the minimum index meeting $n_j \neq b-1$ to scan components of a vector $v_n$: a simple processing.

Incidentally, an attempt to generate 100,000 points by using a program created with a C compiler on IBM RISC System/6000 in accordance with both the method described in the above treatise by P. Bratley and that of the present invention revealed that the former took 60s and the latter took only 7s, thus proving a 8.5-fold improvement in computational speed.

Well, a hardware performing these operations will be described.

If executed in a computer program, these operations use such a hardware configuration as shown in FIG. 1.

This configuration is an ordinary configuration in which a CPU 102 for performing the functions of arithmetic/logic operation and I/O control, a main memory (RAM) 104 for loading a program and giving a working area for the CPU 102, a keyboard 106 for keying in a command or character string, an operating system for controlling the CPU, files including the content for initializing a matrix T, a hard disk 108 for storing a computing program for pricing a derivative security related to the present invention, a display device 110 for displaying the scanned result of database, and a mouse 112 for pointing any point on the surface of the display device 110, and sending the positional information to the CPU are connected to a bus 101. In this embodiment, a RISC System/6000 (Trademark of IBM Corp.) sold from IBM is used. However, the present invention may be carried out using personal computer systems such as PS/2 (Trademark of IBM Corp.), PS/55 (Trademark of IBM Corp.) and the like provided likewise from IBM, and the present invention carried out in a computer program is not limited to a definite hardware configuration.

As an operating system, this embodiment uses AIX (Trademark of IBM Corp.). In the case of using such a hardware configuration as PS/2 or PS/55, however, such operating systems as Windows (Trademark of Microsoft), OS/2 (Trademark of IBM Corp.), PC-DOS and MS-DOS (Trademark of Microsoft) can be used and implementing the present invention in a computer program is not limited to a definite operating system environment.

Figure 2:
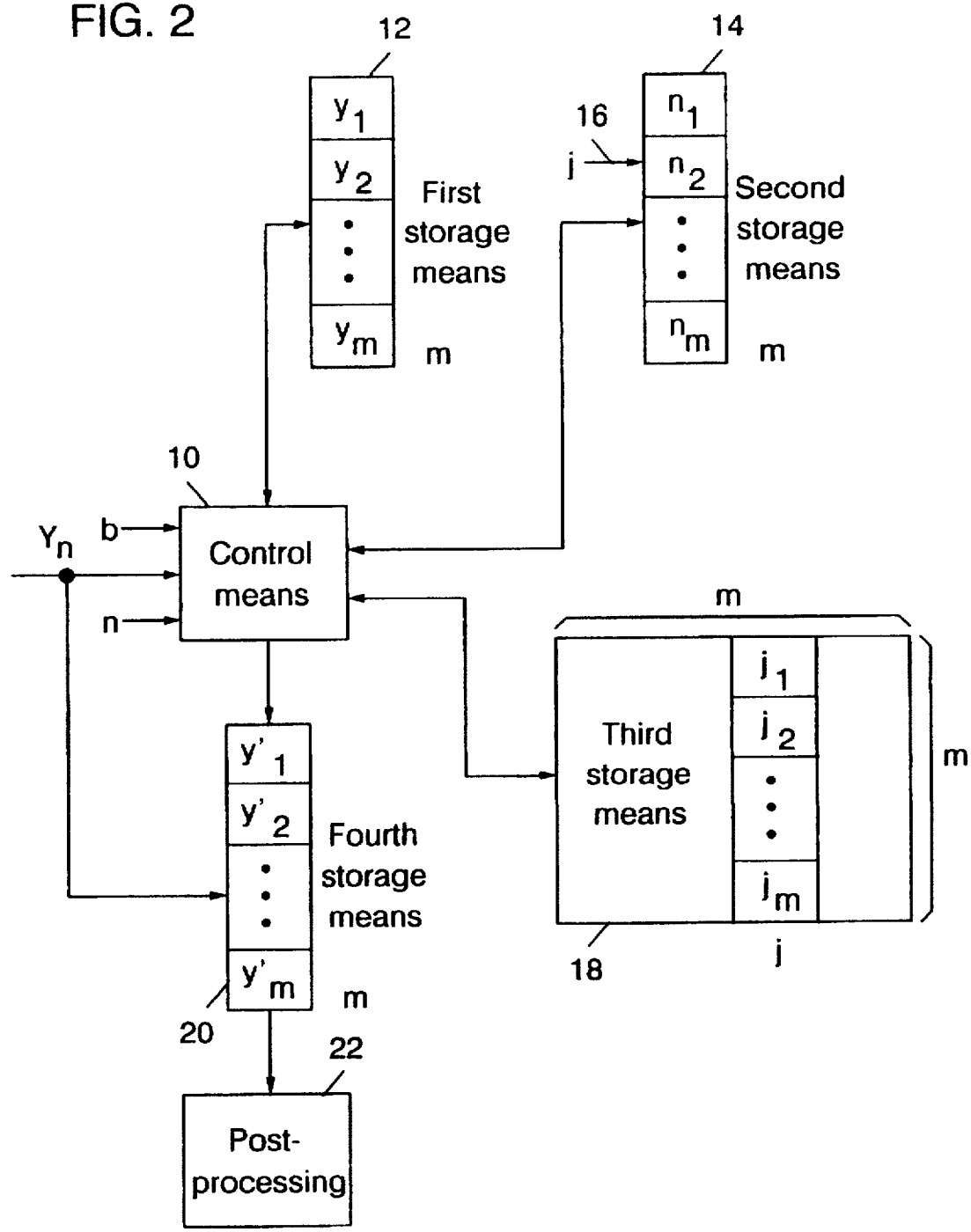
FIG. 2 is a block diagram showing the configuration of apparatus for implementing the present invention.

Now, FIG. 2 shows the implementation in a dedicated hardware. The control means 10 receives $Y_n$, number n and number b as input. For this input $Y_n$, an output from a fourth storage means 20 may serve in some cases. The control means 10 is connected to a first storage means to a fourth storage means, and the necessary data are divided and stored in individual storage means separately. However, these storage means may be separated and may use the divisions of one storage means. The last output is stored in a fourth storage means, the output of which is connected to a post-processing block 22 for the subsequent processing (for example, multiple integral of a function f). The number of storage locations in each storage means in one dimension is determined as follows: A first storage means 12, second storage means 14, and fourth storage means 20 each has m storage locations for accommodating the expanded components of number n and an n-th low-discrepancy sequence $Y_n$, whereas a third storage means 18 has m×m storage locations.

The control means 22, capable of performing an arithmetic operation, operates as follows:

To begin with, mention that a generation matrix T is previously stored in a third storage means 18 and any row component thereof can be fetched according to the need.

First, on inputting a number n and an n-th element of the low-discrepancy sequence $Y_n$, the control means 22 expands n and $Y_n$ in b (b: prime number equal to or more than 2) scale. That is, $Y_n$ is expanded into $y_m b^{m-1}+ \ldots y_2 b + y_1$ and these $Y_m, \ldots, Y_2, Y_1$ in sequence are stored into a first storage means 12. The sequence may start either with ym or with y1, but a way of fetching presents a problem for a later processing. Similarly, a number n is also expanded into $n=n_m b^{m-1}+ \ldots n_2 b + n_1$ and these $n_m, \ldots, n_2, n_1$ in sequence are stored into a second storage means 14.

Then, the control means 10 scans the second storage means 14 from the storage location for $n_1$. For this scanning, a pointer 16 is used and steps from the storage location for $n_1$. A counter is incremented by 1 for each step move of the pointer 16. The control means 10 checks for $n_j \neq b-1$ in each storage location and detects the minimum counter value j meeting the condition $n_j \neq b-1$. In response to this, the control 10 fetches the j-th row component ($j_m, \ldots, j_2, j_1$) from the third storage means 18. A way of fetching this may start either with $j_m$ or with $j_1$, but $y_m$ must be first fetched among the components of $Y_n$ if starting with $j_m$. Similarly, if starting with $j_1$, $y_1$ must be first fetched.

In either case, each component of a first storage means 12 and the corresponding component of a third storage means 18 are fetched and added in modulo b to calculate $j_1+y_1, \ldots, j_m+y_m$. The calculated results in sequence are stored into a fourth storage means 20. In this way, the calculation of $Y_{n+1}$ is completed. Because of being obtained actually in a form of b scale expansion, this $Y_{n+1}$ must be restored to the original form, but is stored into the fourth storage means 20 in a form of b scale expansion for convenience of later calculation.

Furthermore, when it is desired to calculate $Y_{n+2}$, $Y_{n+1}$ is now inputted from the fourth storage means 20 into the control means 10 in place of $Y_n$. In contrast to the preceding case, no processing for expansion is required because $Y_{n+1}$ has already been expanded. Thus, the control means 10 first expands a number n+1 in b scale. The subsequent processes will be omitted because of being the same as above.

In an apparatus shown in FIG. 2, adding b-scale expanded components of $Y_n$ stored in a first storage means 12 to a j-th row components of a generator matrix T stored in a third storage means 18 must be performed in appropriate pairs and therefore a FIFO (First-In First-Out) buffer may be employed for arranging the order of fetching and storing.

Alternately, there is also a way in which a second storage means 14 is scanned from $n_m$, the initial value of a counter is set to m and a value of the counter is decremented by 1 for each scanning step in contrast to the above scanning way in which a second storage means 14 is scanned from $n_1$ and a value of the counter is incremented. However, since the minimum value j meeting $n_j \neq b-1$ is searched for, the way of decrementing the count takes more time.

The above description refers to calculating $Y_{n+1}$ from $Y_n$, but actually, $Y_1$ is inputted to the control means 10 and the processing starts with this point.

Processing in a high dimension

On the basis of the above description, processing in generating a k-dimensional low-discrepancy sequence (in particular, Faure sequence) will be described referring to FIG. 3. This FIG. 3 shows a processing of the present invention implemented using a computer program in the apparatus shown in FIG. 1.

Herein, a processing of calculating the n+1-th point $(u_{n+1}^{(1)}, \ldots, u_{n+1}(k))$ will be described for a given n-th point $(u_n^{(1)}, \ldots, u_n^{(k)})$ in a k-dimensional space. However, actually, on giving the coordinate values of a 1st point $(u_1^{(1)}, \ldots, u_1^{(k)})$ initially and applying the processing of FIG. 3 iteratively, arbitrary number of points are generated.

It is to be noted that the above generator matrix T is separately prepared for each coordinate in a k-dimensional space. Here, let an i-th generator matrix be designated with $T^{(i)}$.

Figure 3:
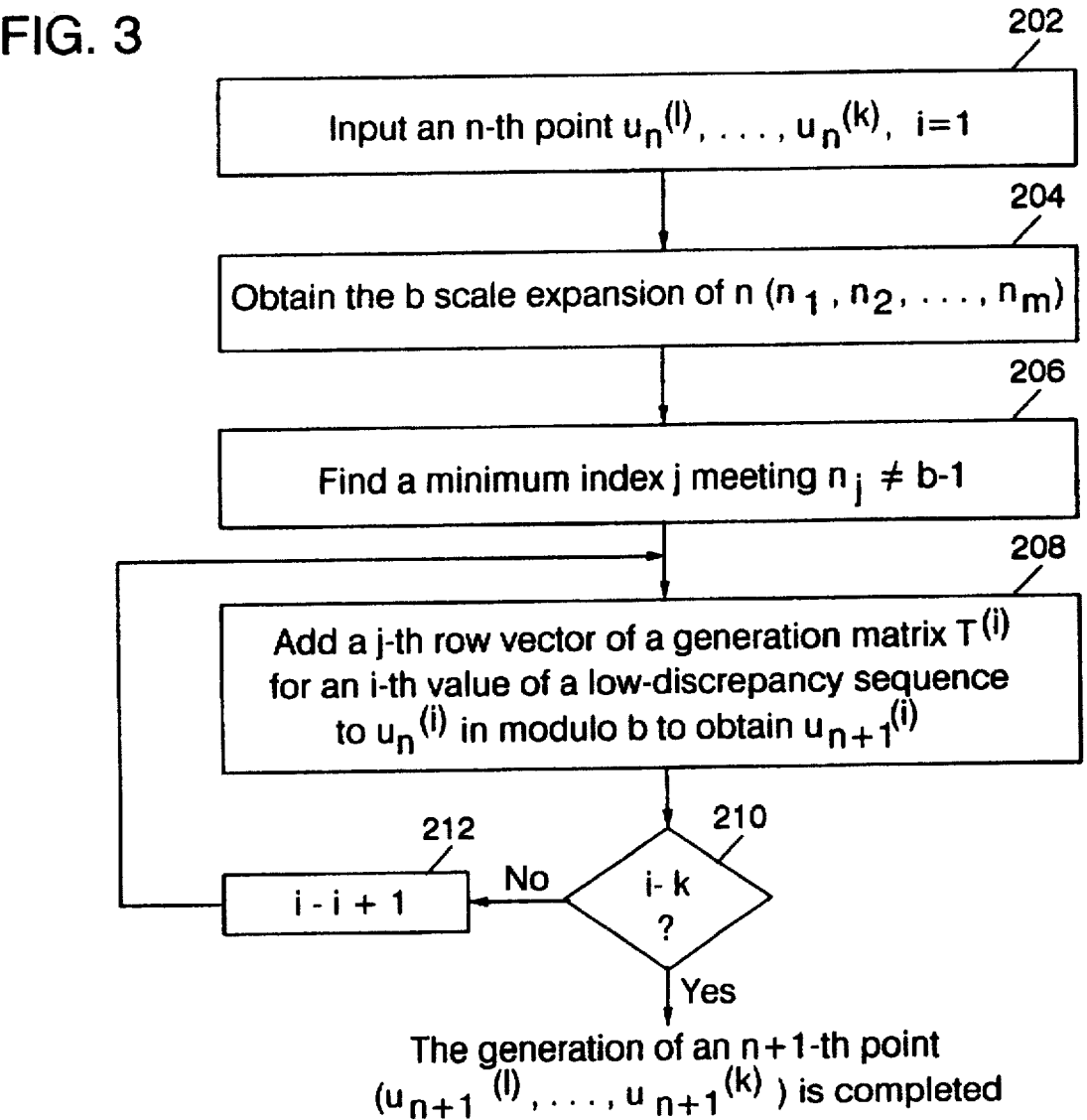
FIG. 3 is a flowchart showing the processing of generating a k-dimensional low-discrepancy sequence.

At the step 202 of FIG. 3, an n-th point $(u_n^{(1)}, \ldots, u_n^{(k)})$ in a k-dimensional space is given and a value i representing the coordinate number of a point to be generated is also set to 1.

At the step 204, n is extended in b scale following a fixed prime number b wherein b is equal to or more than the number k of dimension, a m component vector $(n_1, n_2, \ldots, n_m)$ corresponding to the number n is calculated.

At the step 206, a minimum j meeting $n_j \neq b-1$ is found by scanning the components of a m component vector $(n_1, n_2, \ldots, n_m)$ created in the step 204.

At the step 208, a j-th row vector of a generator matrix $T^{(i)}$ for an i-th value and $u_n^{(i)}$ are added in modulo b in accordance with the present invention to obtain $u_{n+1}^{(i)}$.

At the step 210, it is determined whether i=k or not. If yes, all values of the n+1-th point are found to be calculated.

If not, all value of the n+1-th point are not yet completed. So, increment i by 1 at the step 212 and then return to the step 208 to calculate the next value of the n+1-th point.

Now, how to implement the present invention in a dedicated hardware will be described.

Though only the 1-dimensional case was considered in FIG. 2, extension to the k-dimensional is easily performed. That is, a first storage means 12 have only to comprise m×m storage locations in contrast to 1×m ones in FIG. 2. Because of having need of k generation matrices, a third storage means 18 has only to comprise m×m×k storage locations in contrast to that for a single generation matrix in FIG. 2. Also in a fourth storage means 20, extension to m×m storage positions is only necessary for storing individual components of values of low-discrepancy sequences generated. Instead of $Y_n$, $u_n^{(1)}, \ldots, u_n^{(k)}$ is inputted to a control means 10. In a third storage means 18, management may be performed for each block of m×m storage locations storing a generator matrix T and a signal for selecting a block may be sent from the control means 10 to the third storage means 18.

However, if the system is so arranged to input one $u_n^{(i)}$ at a time to the control means 10, a first storage means 12 may be similar to a 1-dimensional case. Unlike a first storage means 12, a third storage means 18 uses different generator matrices T for different i, needs so many T's as the number of i and accordingly needs the above size of storage locations. A fourth storage means 20 is allowable to be similar to that of the 1-dimensional case when only one block result is stored, but has desirably as many storage locations as for the k-dimensional components because the feedback loop from the fourth storage means 20 to the control means 10.

Application to a multiple integral

Figure 4:
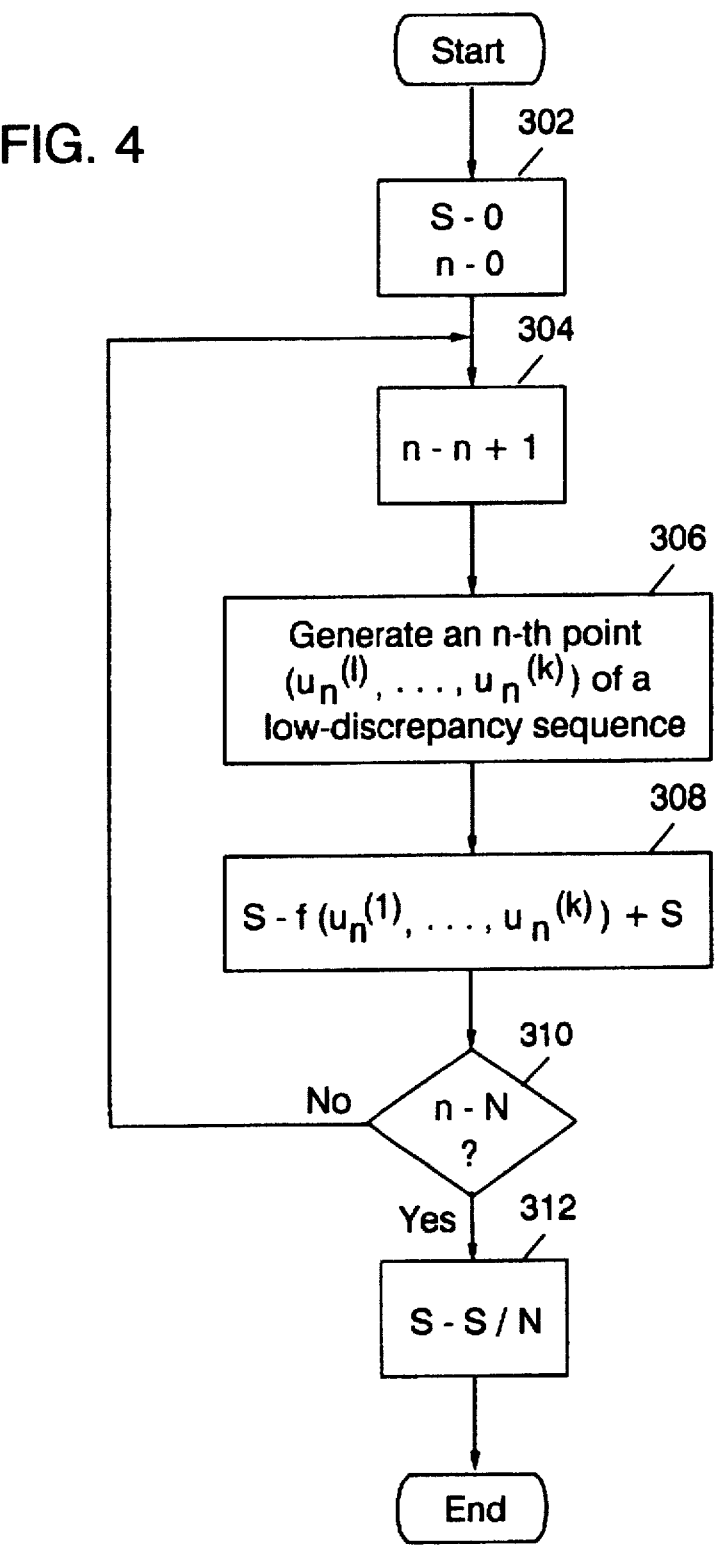
FIG. 4 is a flowchart showing the processing of calculating a multiple integral by using k-dimensional low-discrepancy sequences.

Next, the processing of calculating a multiple integral by using a k-dimensional low-discrepancy sequence will be described referring to FIG. 4. FIG. 4 shows an implementation of the present invention made by using a computer program in a computer system shown in FIG. 1. Here, a function with k augments $f(x_1, x_2, \ldots, X_k)$ is assumed to be subjected to a multiple integral in a k-dimensional space spanned by individual augments.

At the step 302 of FIG. 4, 0 is stored in a variable S for storing the integrated result and in a variable n for storing the number of points of a k-dimensional low-discrepancy generated for calculating an integral.

At the step 304, n is incremented by 1. At the step 306, an n-th point $(u_n^{(1)}, \ldots, u_n^{(k)})$ in a k-dimensional space is generated by using the steps shown in FIG. 3.

At the step 308, $f(u_n^{(1)}, \ldots, u_n^{(k)})$ is calculated and the resultant value is added to S. Incidentally, it should be noted that the step 306 treats each $u_n^{(i)}$ ($1 \leq i \leq k$) as a vector with elements comprising components created by expansion of each individual value in b scale whereas the step 308 treats each $u_n^{(i)}$ ($1 \leq i \leq k$) as a scalar value when substituting it into f.

At the step 310, it is decided whether n reaches a prearranged value N or not. If no, return to the step 304 of incrementing n by 1. Meanwhile, a value of N is determined according to a required accuracy of calculations and the accuracy improves but the time for calculations becomes longer with larger value of N. When generating a random sequence in accordance with the linear congruence as with an ordinary Monte Carlo method, the distribution of generated points is not so wide and a sufficient accuracy cannot be obtained unless a considerably large value of N is taken. A low-discrepancy sequence exhibits an improved property about this point and the generated points give a rather better distribution than those generated by the linear congruence method, thereby enables a sufficient accuracy to be attained with a smaller value of N.

If it is decided at the step 310 that n reaches a prearranged number N, a value normalized by dividing a value of S by N is stored in S at the step 312, and finally this value of S stands for a integrated value.

Figure 5:
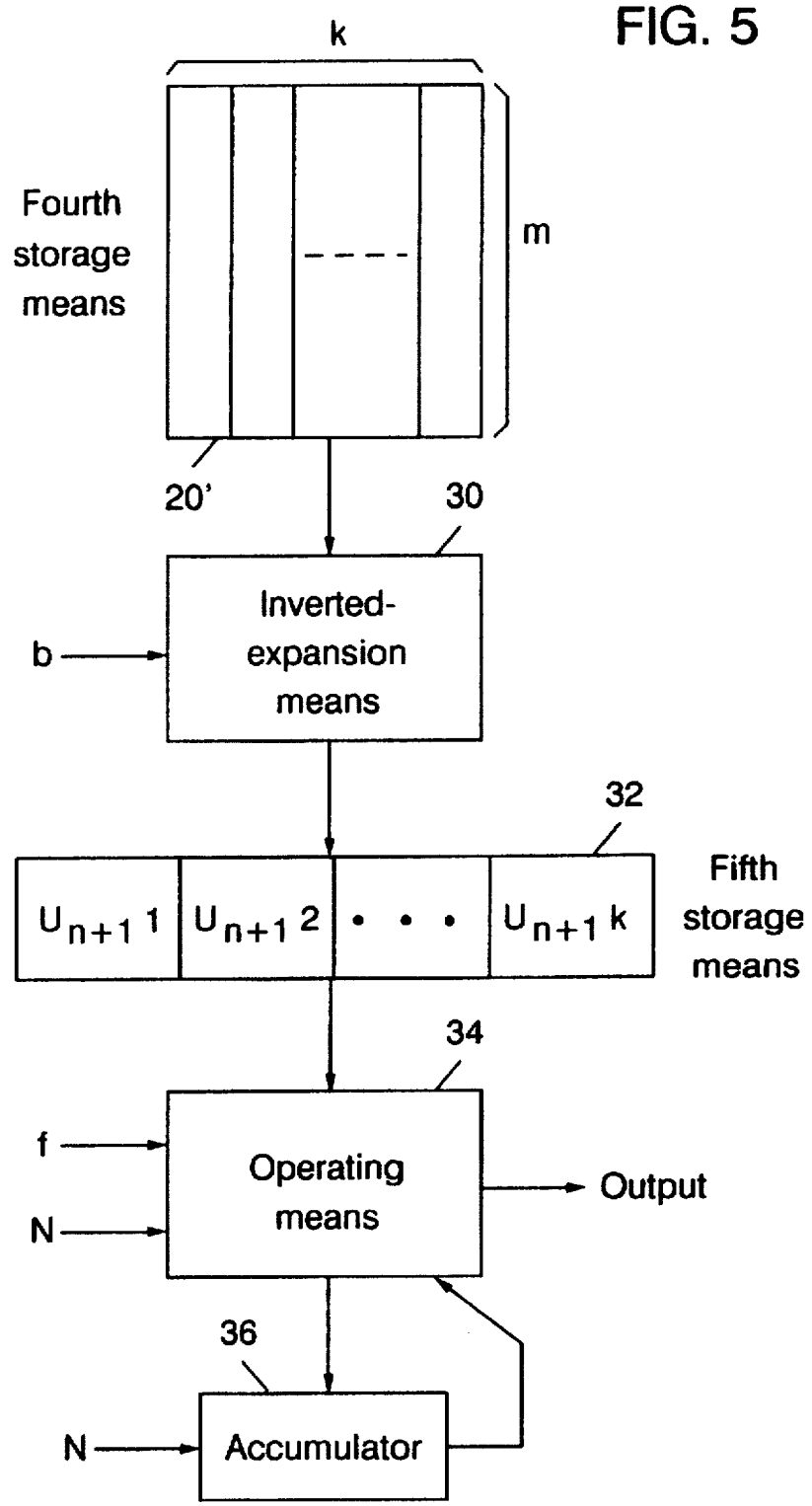
FIG. 5 is a block diagram showing an apparatus for calculating a multiple integral by using k-dimensional low-discrepancy sequences.

Then, returning to FIG. 2, explain the post-processing block 22 for performing a multiple integral. FIG. 5 shows the details of this post-processing block 22. In FIG. 5, a fourth storage means 20' is so extended as to have storage location for accommodating k-dimensional components. A fourth storage means 20' is connected to an inverted-expansion means 30 having a number b as another input. This inverted-expansion means 30 is arranged to store an output in a fifth storage means 32. The fifth storage means 32 has k storage locations so as to be able to store k values for one low-discrepancy sequence. Furthermore, an operating means 34, connected to the fifth storage means 32 and receiving a function f and the number N of generated low-discrepancy sequences also as input, is connected to an accumulator 36 and an output of the accumulator 36 is returned to the operating means 34.

Well, the operations of FIG. 5 will be demonstrated. Since the portions preceding to the fourth storage means 20' was described in FIG. 2, the subsequent operations will be described with the components created by the b scale expansion of each of $u_{n+1}^{(1)}, \ldots, u_{n+1}^{(k)}$ already stored in the fourth storage means 20'. The inverted-expansion means 30 reads out the b scale expanded components for each of $u_{n+1}^{(1)}, \ldots, u_{n+1}^{(k)}$ from the fourth storage means 20' and creates $u_{n+1}^{(1)}, \ldots, u_{n+1}^{(k)}$ by inverted-expanding the components for each in b scale. If the number of dimensions is k, the operating means 34 fetches $u_{n+1}^{(1)}, \ldots, u_{n+1}^{(k)}$ at the very moment k of un+1(i) are created.

Previously, an integrand $f(x_1, x_2, \ldots, X_k)$ is inputted to and set at the operating means 34. Thus, on inputting $u_{n+1}^{(i)}$ to a variable $x_1$, a value of $f(u_{n+1}^{(1)}, \ldots, u_{n+1}^{(k)})$ is calculated. This function value is outputted to the accumulator 36. The operating means 34 calculates function values for low-discrepancy sequences generated successively, while the accumulator 36 accumulates function values by summing up. The accumulator 36 has a counter and returns the accumulated value to the operating means 34 after N inputs are performed from the operating means 34. Since a value of N is inputted thereto, the operating means 34 divides the input value from the accumulator 36 by N. In this way, a k-multiple integral of a function $f(x_n^{(1)}, \ldots, X_n^{(k)})$ is performed.

Detailed description in the above part was omitted, but the counter of the accumulator 36 is reset and the accumulated value is also reset at the very moment the counter comes to indicate N.

Application to calculations for pricing a derivative security

One example of calculation for pricing a derivative security will be described as a typical field of application requiring a calculation of multiple integral. The following is an equation for calculating the current value E(PV) of a bill endorsed for pledge:

E(PV)=∫PV(i, w, a) f(i, w, a) didwda where PV is given as follows:

$$PV = C\frac{1-w_1}{1-i_1} + C\frac{w_1 a_k}{1-i_1} + C\frac{(1-w_1)(1-w_2)}{(1+i_1)(1+i_2)} + \ldots$$

In the above expressions, C is a periodical payment on the mortgage, $i_t$ is the rate of interest on the month t, $w_t$ is the rate of prepayment on the month t and $a_{k-t}$ is a remaining annuity.

An actual calculation is performed over a long term and so the number of $i_t$ becomes large, thus requiring a multiple integral of about 360 dimensions in general. This takes many number of days for calculation in a conventional 10 method, but using the technique of the present invention enables this calculation to be completed within several hours.

Since using the above method and apparatus enables a low-discrepancy sequence to be generated at high speed, calculating a multiple integral of a function f becomes also speedier. Well then, consider executing a calculation in a plurality of processors.

On Parallel Processing

In the above, it was shown that $Y_{n+1}=Y_n\ ADD_b\ Te_j$ is equivalent to $Y_n=TGv_n$. That is, $Y_n$ for any n can be calculated by a matrix multiplication of a generator matrix T and a matrix G (shown in Expression 1 or the like) and a vector $v_n$ comprising components created by the b scale expansion of a number n wherein b is a prime number equal to or greater than 2. It based upon the property of a matrix G that the calculation can cope with any n. And, once $Y_n$ is generated, $Y_{n+1}$ is calculated by using the above relation $Y_{n+1}=Y_n\ ADD_b\ Te_j$ in accordance with a high-speed method without matrix multiplication. Since Yn can be calculated for any n, no idle calculation with $Y_{n+1}=Y_n\ ADD_b\ Te_j$ is necessary from 1 to a needed n. This is important.

Figure 6:
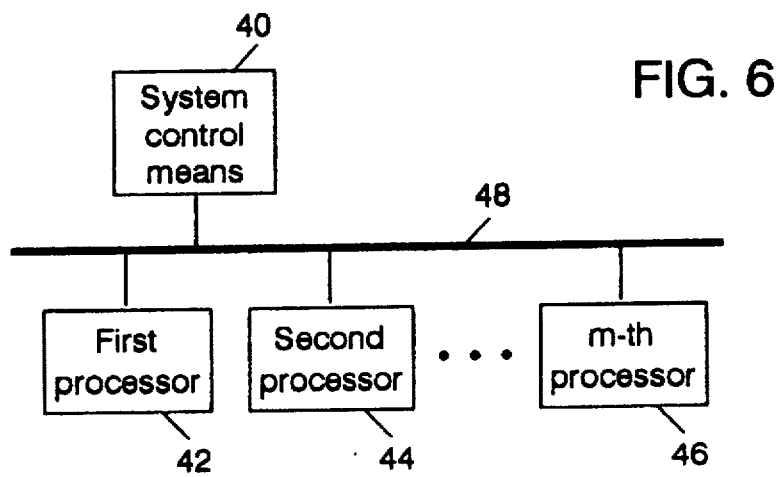
FIG. 6 is a block diagram showing one example of apparatus configuration in a parallel processing.
Figure 7:
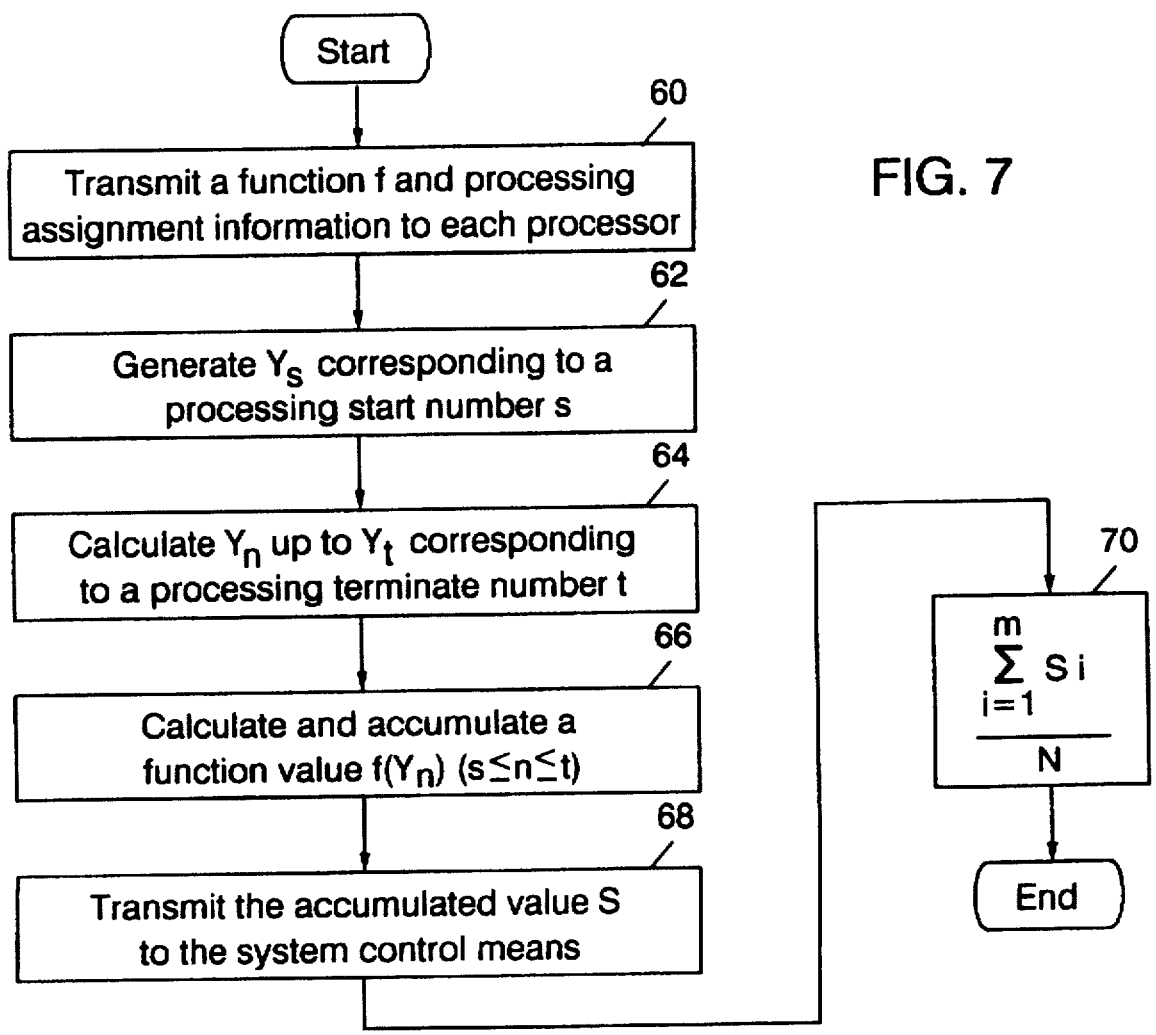
FIG. 7 is a high-level flowchart showing the operations of an apparatus in FIG. 6.

With this in mind, refer to FIG. 6 and FIG. 7.

FIG. 6 shows a system in which a plurality of processors (42, 44, 46) and a system control means 40 is connected through a bus 48. This system control means 40 may be provided elsewhere than the location of processors such as a first processor 42 or may be included in one of a plurality of processors (42, 44, 46).

Operations of this system will be described referring to FIG. 7.

The system control means 40 identifies the number of processors available for the processing in this system and the ID of the available processors and calculates to which processor each of all low-discrepancy sequences is assigned. If there is no deviation in jobs of the whole system, a uniform assignment is enough to individual processors. However, a processing start number s and a processing terminate number t is generally given as processing assignment information. The terminate number t can be replaced with the number of low-discrepancy sequences in the relevant processor. In addition, if processing is always assigned uniformly to each processor, each processor need not informing of the number of generated low-discrepancy sequences or the processing terminate number t for each start of processing and accordingly sending them may be omitted (step 60).

Each processor receives the respective different processing start number and generates $Y_s$ following $Y_n=TGv_n$ (step 62). Capability of generating $Y_s$ for any s in this way owes to the property of a matrix G as mentioned above.

Once $Y_s$ can be generated, low-discrepancy sequences up to $Y_t$ corresponding to the processing terminate number t received is generated following $Y_{n+1}=Y_n\ ADD_b\ Te_j$ (step 64). Because of having been mentioned above, details of this processing will be omitted. The processing can be implemented using the procedure shown in FIG. 3 and the apparatus (including the extension thereof) shown in FIG. 2. Furthermore, when performing a multiple integral in the present invention, an integrand f must be also estimated, but the step 64 may use either $Y_{n+1}=Y_n\ ADD_b\ Te_j$ or $Y_n=TGv_n$ if it takes much time to estimate the integrand f. This is because the whole execution time may become much the same whether using the calculation method following $Y_{n+1}=Y_n\ ADD_b\ Te_j$ or using that following $Y_n=TGv_n$ in which matrix multiplication is performed for each time. If viewed solely from the standpoint of generating a low-discrepancy sequence, however, it is evident that calculation following $Y_{n+1}=Y_n\ ADD_b\ Te_j$ is speedier.

After the assigned elements of the low-discrepancy sequence from $Y_s$ to $Y_t$ are generated in each processor or every time when each low-discrepancy sequence is generated, substitution into a function f sent from the system control means 40 is performed. Adding all calculated function values $f(Y_n)$ ($s \leq n \leq t$) together, $S_i$ is calculated wherein a number i is the number of a processor and the number of processors is m (step 66).

This calculated value $S_i$ ($1 \leq i \leq m$) is sent from all processors to the system control means 40 (step 68). The system control means 40 adds all sent $S_j$ together and divides the sum by N the number of all low-discrepancy sequences (step 70). With this, calculating a multiple integral of a function f is completed.

In the above description, after a value of function $f(Y_n)$ is calculated for each generated low-discrepancy sequence, all obtained values are added together in each processor, but the obtained values may be sent to the system control means 40 before addition. However, some other processing may be delayed on account of the traffic of a bus 48, sending processing in each processor or the like. Also, at the time a low-discrepancy sequence are generated in each processor, it is also possible to send the obtained sequence to the system control means 40. In this case, sending a function f to each processor becomes needless. The problems in such a case is similar to those of sending the values of function prior to the addition.

When each processor includes the apparatus shown in FIG. 2 and FIG. 5, a modification is needed in which an output from the accumulator 36 in FIG. 5 is put to output from the relevant processor rather than being returned to the operating means 34. In addition, the accumulator 36 requires input of N generated low-discrepancy sequences but N must be replaced with the number of low-discrepancy sequences to be processed in the relevant processor.

In the above description of a parallel processing, $Y_n$ is employed for simplification, but extension to $(u_{n+1}^{(1)}, \ldots, u_{n+1}^{(k)})$ is possible as mentioned above and accordingly this means the processing of a multiple integral for $(u_{n+1}^{(1)}, \ldots, u_{n+1}^{(k)})$ is possible.

Incidentally, though low-discrepancy sequences are specified to be calculated following $Y_{n+1}=Y_n$ $ADD_b$ $Te_j$ or $Y_n=TGv_n$ at the step 64 in FIG. 7, each processor is arranged to be computable following either relation, the system control means 40 may be arranged to detect the property of a function f and transmit the switch information indicating which method is used by each processor to each processor.

Furthermore, connecting a plurality of processing units in a distributed processing environment connected through LAN or the like and using local memories distributed in each processing unit enables processing in a huge dimensions to be coped with the above simple modification.

Advantages of the Invention

As described above, this invention gives marked advantages of extremely elevating the generating speed of low-discrepancy sequences by providing a technique of performing a modulo addition to a row of a generator matrix in successive generation of low-discrepancy sequences.

Thus, the calculation speed of various numerical calculations (typically, multiple integral) using low-discrepancy sequences is substantially improved.

Furthermore, a parallel processing implements a high-speed calculation of low-discrepancy sequences, thereby enabling a multiple integral and the like to be calculated at high speed. In the case of a parallel processing, a sufficient calculating speed can be obtained in multiplication of matrices if the whole calculating time of a multiple integral is considered.

Incidentally, though application to calculations for pricing a derivative security was described in the above embodiment, the present invention is applicable to a wide field such as calculation physics, fluid mechanics and computer graphics. For a background of calculation techniques using such a low-discrepancy sequence, refer to, for example, J. E. Traub, H. Wozniakowski, "Breaking Intractability", SCIENTIFIC AMERICAN, January 1994.

While the invention has been particularly shown and described with reference to a preferred embodiment and process, it will be understood that various changes in form and detail may be made therein without departing from the spirit and scope of the invention.

What is claimed is:

1. An apparatus for generating a low-discrepancy sequence, comprising:

(a) means for expanding a value of n-th element of said low-discrepancy sequence Yn in b scale and storing m components created by the expansion into first storage means in sequence wherein said n is an integer equal to or more than 1 and said b is a prime number equal to or more than 2;

(b) means for expanding said number n in b scale, and storing said created expansion $(n_m, n_{m-1}, \ldots, n_1)$ in sequence into second storage means;

(c) means for scanning said second storage means in sequence and detecting a minimum order j wherein $n_j$ is not equal to b−1;

(d) means in response to said means (c) for reading out j-th row components of a low-discrepancy sequence generator matrix T stored in advance and components of said low-discrepancy sequence {Yn} stored in said first storage means in sequence, adding said j-th row components of said generator matrix and said components of said n-th element of the low-discrepancy sequence Yn read out in the same order in modulo b, and storing the result of the addition in sequence into third storage means.

2. A method for generating a low-discrepancy sequence, comprising the steps of:

(a) expanding a value of an n-th element of the low-discrepancy sequence Yn in b scale and storing m components created by the expansion into first storage means in sequence wherein said n is an integer equal to or more than 1 and said b is a prime number equal to or more than 2;

(b) expanding said number n in b scale, and storing said created expansion $(n_m, n_{m-1}, \ldots, n_1)$ in sequence into second storage means;

(c) scanning said second storage means in sequence and detecting a minimum order j wherein $n_j$ is not equal to b−1;

(d) in response to said step (c), reading out j-th row components of a low-discrepancy sequence generator matrix T stored in advance and components of said n-th element of the low-discrepancy sequence {Yn} stored in said first storage means in sequence, adding said j-th row components of said generator matrix to said components of said n-th element of the low-discrepancy sequence {Yn} read out in the same order in modulo b, and storing the result of the addition in sequence into third storage means.

3. An apparatus for generating a low-discrepancy sequence, comprising:

(a) means for expanding an i-th coordinate value $u_n^{(i)}$ ($1 \leq i \leq k$) of an n-th element of the low-discrepancy sequence $(u_n^{(1)}, \ldots, u_n^{(k)})$ in b scale, and storing m components created by the expansion of each said value in sequence into first storage means wherein said n is an integer equal to or more than 1 and said b is a prime number equal to or more than k;

(b) means for expanding said number n in b scale, and storing said created expansion $(n_m, n_{m-1}, \ldots, n_1)$ in sequence into second storage means;

(c) means for scanning said second storage means in sequence, and detecting a minimum order j wherein $n_j$ is not equal to b−1;

(d) means in response to said means (c) for reading out j-th row components of a generator matrix $T^{(i)}$ stored in advance for an i-th coordinate value of said low-discrepancy sequence and said components created by the expansion of said i-th coordinate value of said n-th element of the low-discrepancy sequence in sequence, and adding said j-th row components and said components created by said expansion read out in the same order in modulo b, and storing the result of the addition in sequence into third storage means.

4. A method for generating a low-discrepancy sequence, comprising the steps of:

(a) expanding an i-th coordinate value $u_n^{(i)}$ ($1 \leq i \leq k$) of an n-th element of the low-discrepancy sequence $(u_n^{(1)}, \ldots, u_n^{(k)})$ in b scale, and storing m components created by the expansion of each said value in sequence into first storage means wherein said n is an integer equal to or more than 1 and said b is a prime number equal to or more than k;

(b) expanding said number n in b scale, and storing said created expansion $(n_m, n_{m-1}, \ldots, n_1)$ in sequence into second storage means;

(c) scanning said second storage means in sequence, and detecting a minimum order j wherein $n_j$ is not equal to b−1;

(d) in response to said step (c), reading out j-th row components of a generator matrix $T^{(i)}$ stored in advance for an i-th coordinate value ($1 \leq i \leq k$) of said low-discrepancy sequence and said components created by the expansion of said i-th value of said n-th element of the low-discrepancy sequence in sequence, and adding said j-th row components and said components created by said expansion read out in the same order in modulo b, and storing the result of the addition in sequence into third storage means.

5. An apparatus for calculating a multiple integral of function f, comprising:

(a) means for defining a function $f(x_1, x_2, \ldots, X_k)$ related to k elements;

(b) means for expanding an i-th coordinate value $u_n^{(i)}$ ($1 \leq i \leq k$) of an n-th element of the low-discrepancy sequence $(u_n^{(1)}, \ldots, u_n^{(K)})$ in b scale, and storing m components created by the expansion of each said value in sequence into first storage means wherein said n is an integer equal to or more than 1 and said b is a prime number equal to or more than k;

(c) means for expanding said number n in b scale, and storing said created expansion $(n_m, n_{m-1}, \ldots, n_1)$ in sequence into second storage means;

(d) means for scanning said second storage means in sequence, and detecting a minimum order j wherein $n_j$ is not equal to b−1;

(e) means in response to said means (d) for reading out j-th row components of a generator matrix $T^{(i)}$ stored in advance for an i-th coordinate value ($1 \leq i \leq k$) of said low-discrepancy sequence and said components created by the expansion of said i-th coordinate value of said n-th element of the low-discrepancy sequence in sequence, and adding said j-th row components and said components created by said expansion read out in the same order in modulo b, and storing the result of the addition in sequence into third storage means;

(f) means for inverted-expanding said m results of the addition in b scale, and storing said created value $u_{n+1}^{(i)}$ into fourth storage means;

(g) means for calculating a value of $f(u_{n+1}^{(1)}, \ldots, u_{n+1}^{(k)})$ if said means (f) stores a coordinate value $u_{n+1}^{(i)}$ ($1 \leq i \leq k$) into said fourth storage means;

(h) means for controlling said means (b) to (g) so as to accumulate a value of generated $f(u_{n+1}^{(1)}, \ldots, u_{n+1}^{(k)})$ from n=1 to n=N, wherein said N is a predetermined integer greater than 1; and (i) means in response to said means (h) for dividing said accumulated value by N.

6. A method for calculating a multiple integral of function f, comprising the steps of:

(a) defining a function $f(x_1, x_2, \ldots, x_k)$ related to k elements;

(b) expanding an i-th coordinate value $u_n^{(i)}$ ($1 \leq i \leq k$) of an n-th element of the low-discrepancy sequence $(u_n^{(1)}, \ldots, u_n^{(k)})$ in b scale, and storing m components created by the expansion of each said value in sequence into first storage means wherein said n is an integer equal to or more than 1 and said b is a prime number equal to or more than k;

(c) expanding said number n in b scale, and storing said created expansion $(n_m, n_m, \ldots, n_1)$ in sequence into second storage means;

(d) scanning said second storage means in sequence, and detecting a minimum order j wherein $n_j$ is not equal to b−1;

(e) in response to said means (d), reading out j-th row vector of a generator matrix $T^{(i)}$ stored in advance for an i-th coordinate value ($1 \leq i \leq k$) of said low-discrepancy sequence and said components created by the expansion of said i-th coordinate value of said n-th element of the low-discrepancy sequence in sequence, and adding said j-th row components and said components created by said expansion read out in the same order in modulo b, and storing the result of the addition in sequence into third storage means;

(f) inverted-expanding said m results of the addition in b scale, and storing said created value $u_{n+1}^{(i)}$ into fourth storage means;

(g) calculating a value of $f(u_{n+1}^{(1)}, \ldots, u_{n+1}^{(k)})$ if said step (f) stores a coordinate value $u_{n+1}^{(i)}$ ($1 \leq i \leq k$) into said fourth storage means;

(h) repeating said steps (b) to (g) so as to accumulate a value of generated $f(u_{n+1}^{(1)}, \ldots, u_{n+1}^{(k)})$ from n=1 to n=N in an accumulator, wherein said N is a predetermined integer greater than 1; and (i) in response to said accumulator, dividing said accumulated value by N.

7. A system for generating a low-discrepancy sequence, comprising:

a plurality of processors; and means for transmitting processing assignment information including a processing start number s to each of said processors; wherein each said processor comprising:

(a) means for receiving said processing assignment information, and creating an element of the low-discrepancy sequence $(u_s^{(1)}, \ldots, u_s^{(k)})$ corresponding to said processing start number s, and storing said created low-discrepancy sequence into first storage means;

(b) means for expanding an i-th coordinate value $u_n^{(i)}$ ($1 \leq i \leq k$) of an n-th element of the low-discrepancy sequence $(u_n^{(1)}, \ldots, u_n^{(k)})$ in b scale, and storing m components created by the expansion of each said value in sequence into second storage means, wherein said b is a prime number equal to or more than k;

(c) means for expanding said number n in b scale, and storing said created expansion $(n_m, n_{m-1}, \ldots, n_1)$ in sequence into third storage means;

(d) means for scanning said third storage means in sequence, and detecting a minimum order j wherein $n_j$ is not equal to b-1;

(e) means in response to said means (d) for reading out j-th row components of a generator matrix $T^{(i)}$ stored in advance for an i-th coordinate value ($1 \leq i \leq k$) of said low-discrepancy sequence and said components created by the expansion of said i-th coordinate value of said n-th element of the low-discrepancy sequence in sequence, and adding said j-th row components and said components created by said expansion read out in the same order in modulo b, and storing the results of the addition in sequence into fourth storage means;

(f) means for inverted-expanding said m results of the addition in b scale, and storing said created value $u_{n+1}^{(i)}$ into said first storage means; and (g) means for controlling said means (b) to (f) so as to store said low-discrepancy sequence from s+1-th element to t-th element into said first storage means, wherein said t corresponds to a processing terminate number in each processor, and the s+1-th element of the low-discrepancy sequence is $(u_{s+1}^{(1)}, \ldots, u_{s+1}^{(k)})$, and the t-th element of the low-discrepancy sequence is $(u_t^{(1)}, \ldots, u_t^{(k)})$.

8. The system for generating a low-discrepancy sequence as set forth in claim 7, wherein said means (a) including means for generating an i-th coordinate value $u_n^{(i)}$ of an n-th element of the discrepancy sequence by calculating a b scale expansion $(n_m, n_{m-1}, \ldots, n_1)$ of said number n and using said vector $v_n$ generated from the calculation result and generator matrix $T^{(i)}$ ($1 \leq i \leq k$) and a matrix G.

$$G = \begin{bmatrix} 1 & -1 & & & \\ & 1 & -1 & & \\ & & \cdot & \cdot & \\ & & & 1 & -1 \\ & & & & 1 \end{bmatrix} \pmod{b}$$

9. In a computer system comprising a plurality of processors, a method for generating a low-discrepancy sequence, comprising the steps of:

(a) transmitting processing assignment information including a processing start number s to each of said processors;

(b) in each said processor, receiving the processing assignment information and creating an element of the low-discrepancy sequence $(u_s^{(1)}, \ldots, u_s^{(k)})$ corresponding to said processing start number s, and storing the created low-discrepancy sequence into first storage means;

(c) in each said processor expanding an i-th coordinate value $u_n^{(i)}$ ($1 \leq i \leq k$) of an n-th element of the low-discrepancy sequence $(u_n^{(1)}, \ldots, u_n^{(k)})$ in b scale and storing m components created by the expansion of each said value in sequence into second storage means, wherein said b is a prime number equal to or more than k;

(d) in each said processor expanding said number n in b scale and storing the created expansion $(n_m, n_{m-1}, \ldots, n_1)$ in sequence into third storage means;

(e) in each said processor scanning said third storage means in sequence and detecting a minimum order j wherein $n_j$ is not equal to b-1;

(f) in each said processor in response to said step (e), reading out j-th row components of a generator matrix $T^{(i)}$ stored in advance for an i-th coordinate value ($1 \leq i \leq k$) of the low-discrepancy sequence and said components created by said expansion of the i-th coordinate value of said n-th element of the low-discrepancy sequence in sequence, and adding said j-th row components and said components created by said expansion read out in the same order in modulo b and storing the result of the addition in sequence into fourth storage means;

(g) in each said processor inverted-expanding said m results of the addition in b scale and storing said created value $u_{n+1}^{(i)}$ into said first storage means; and (h) in each said processor, repeating the steps (c) to (g) so as to store said low-discrepancy sequence from the s+1-th element to the t-th element into said first storage means, wherein said t corresponds to a processing terminate number in the relevant processor, and the s+1-th element of the low-discrepancy sequence is $(u_{s+1}^{(1)}, \ldots, u_{s+1}^{(k)})$, and the t-th element of the low-discrepancy sequence is $(u_t^{(1)}, \ldots, u_t^{(k)})$.

10. The method for generating a low-discrepancy sequence as set forth in claim 9, wherein said step (b) including a step of generating an i-th coordinate value $u_n^{(i)}$ of an n-th element of the discrepancy sequence by calculating a b scale expansion $(n_m, n_{m-1}, \ldots, n_1)$ of said number n and using said vector $v_n$ generated from the calculation result and generator matrix $T^{(i)}$ ($1 \leq i \leq k$) and a matrix G.

$$G = \begin{bmatrix} 1 & -1 & & & \\ & 1 & -1 & & \\ & & \cdot & \cdot & \\ & & & 1 & -1 \\ & & & & 1 \end{bmatrix} \pmod{b}$$

11. A computer system for calculating a multiple integral of a function f, comprising: a plurality of processors; and system control means for transmitting a function $f(x_1, x_2, \ldots, x_k)$ related to k elements and processing assignment information including a processing start number s to each of said processors; wherein each of said processors comprises:

(a) means for receiving said processing assignment information, and creating an element of the low-discrepancy sequence corresponding to said processing start number s $(u_s^{(1)}, \ldots, u_s^{(k)})$, and storing the created low-discrepancy sequence into first storage means;

(b) means for expanding an i-th coordinate value $u_n^{(i)}$ ($1 \leq i \leq k$) of an n-th element of the low-discrepancy sequence $(u_n^{(1)}, \ldots, u_n^{(k)})$ in b scale, and storing m components created by the expansion of each said value in sequence into second storage means, wherein said b is a prime number equal to or more than k;

(c) means for expanding said number n in b scale, and storing said created expansion $(n_m, n_{m-1}, \ldots, n_1)$ in sequence into third storage means;

(d) means for scanning said third storage means in sequence, and detecting a minimum order j wherein $n_j$ is not equal to b–1;

(e) means in response to said means (d) for reading out j-th row components of a generator matrix $T^{(i)}$ stored in advance for an i-th coordinate value ($1 \leq i \leq k$) of said low-discrepancy sequence and said components created by the expansion of said i-th coordinate value of said n-th element of the low-discrepancy sequence in sequence, and adding said j-th row components and said components created by said expansion read out in the same order in modulo b, and storing the result of the addition in sequence into fourth storage means;

(f) means for inverted-expanding said m results of the addition in b scale, and storing said created value $u_{n+1}^{(i)}$ into said first storage means;

(g) means for controlling said means (b) to (f) so as to store said low-discrepancy sequence from the s+1-th element to the t-th element into said first storage means, wherein said t corresponds to a processing terminate number in the relevant processor, and the s+1-th element of the low-discrepancy sequence is $(u_{s+1}^{(1)}, \ldots, u_{s+1}^{(k)})$, and the t-th element of the low-discrepancy sequence is $(u_t^{(1)}, \ldots, u_t^{(k)})$;

(h) means for receiving said function f, and reading out the n-th element of the low-discrepancy sequence $(u_n^{(1)}, \ldots, u_n^{(k)})$ ($s \leq n \leq t$) stored in said first storage means, and calculating a value of $f(u_n^{(1)}, \ldots, u_n^{(k)})$;

(i) means for accumulating said created values of function $f(u_n^{(1)}, \ldots, u_n^{(k)})$ ($s \leq n \leq t$); and (j) means for transmitting the calculated values accumulated by said means (i) to said means (g);

while the system control means accumulate values transmitted from said each processor and divides the accumulated value by the number of low-discrepancy sequences created for all said processors.

12. The system for generating a low-discrepancy sequence as set forth in claim 11, wherein said means (a) including means for generating an i-th coordinate value $u_n^{(i)}$ of an n-th element of the discrepancy sequence by calculating a b scale expansion $(n_m, n_{m-1}, \ldots, n_1)$ of said number n and using said vector $v_n$ generated from the calculation result and generator matrix $T^{(i)}$ ($1 \leq i \leq k$) and a matrix G.

$$G = \begin{bmatrix} 1 & -1 & & & \\ & 1 & -1 & & \\ & & \cdot & \cdot & \\ & & & 1 & -1 \\ & & & & 1 \end{bmatrix} (mod\ b)$$

13. In a computer system comprising system control means and a plurality of processors, a method for calculating a multiple integral of a function f, comprising the steps of:

(a) transmitting a function $f(x_1, x_2, \ldots, X_k)$ related to k elements and processing assignment information including a processing start number s to each of said processors from said system control means;

(b) in each said processor, receiving said processing assignment information and creating an element of the low-discrepancy sequence $(u_s^{(1)}, \ldots, u_s^{(k)})$ corresponding to said processing start number s, and storing the created low-discrepancy sequence into first storage means;

(c) in each said processor, expanding an i-th coordinate value $u_{n(i)}$ ($1 \leq i \leq k$) of an n-th element of the low-discrepancy sequence $(u_n^{(1)}, \ldots, u_n^{(k)})$ in b scale and storing m components created by the expansion of each said value in sequence into second storage means, wherein said b is a prime number equal to or more than k;

(d) in each said processor, expanding said number n in b scale and storing said created expansion $(n_m, n_{m-1}, \ldots, n_1)$ in sequence into third storage means;

(e) in each said processor, scanning said third storage means in sequence and detecting a minimum order j wherein $n_j$ is not equal to b–1;

(f) in each said processor in response to said step (e), reading out j-th row components of a generator matrix $T^{(i)}$ stored in advance for an i-th coordinate value ($i \leq i \leq k$) of said element of the low-discrepancy sequence and said components created by the expansion of said i-th coordinate value of said n-th element of low-discrepancy sequence in sequence and adding said j-th row components and said components created by said expansion read out in the same order in modulo b, and storing the results of the addition in sequence into fourth storage means;

(g) in each said processor inverted-expanding said m results of the addition in b scale and storing said created value $u_{n+1}^{(i)}$ into said first storage means;

(h) in each said processor, repeating said steps (c) to (g) so as to store said low-discrepancy sequence from the s+1-th element to the t-th element into said first storage means, wherein said t corresponds to a processing terminate number in the relevant processor, and the s+1-th element of the low-discrepancy sequence is $(u_{s+1}^{(1)}, \ldots, u_{s+1}^{(k)})$, and the t-th element of the low-discrepancy sequence is $(u_t^{(1)}, \ldots, u_t^{(k)})$;

(i) in each said processor reading out the n-th element of the low-discrepancy sequence $(u_n^{(1)}, \ldots, u_n^{(k)})$ ($s \leq n \leq t$) stored in said first storage means and calculating a value of $(u_n^{(1)}, \ldots, u_n^{(k)})$;

(j) in each said processor accumulating said created values of function $f(u_n^{(1)}, \ldots, u_n^{(k)})$ ($s \leq n \leq t$) in an accumulator;

(k) in each said processor, transmitting the calculated values accumulated by said accumulator to said system control means; and (l) in said system control means, accumulating the value transmitted from each said processor and dividing the accumulated value by the number of low-discrepancy sequences created for all said processors.

14. The method for generating a low-discrepancy sequence as set forth in claim 13, wherein said step (b) including a step of generating an i-th coordinate value $u_n^{(i)}$ of an n-th element of the discrepancy sequence by calculating a b scale expansion $(n_m, n_{m-1}, \ldots, n_1)$ of said number n and using said vector $v_n$ generated from the calculation result and generator matrix $T^{(i)}$ ($1 \leq i \leq k$) and a matrix G.

$$G = \begin{bmatrix} 1 & -1 & & & \\ & 1 & -1 & & \\ & & \cdot & \cdot & \\ & & & 1 & -1 \\ & & & & 1 \end{bmatrix} (mod\ b)$$

15. A system for generating a low-discrepancy sequence, comprising: a plurality of processors; and means for transmitting processing assignment information including a processing start number s to each of said processors; wherein each of said processors comprises:

(a) means for receiving said processing assignment information;

(b) means for calculating a b scale expansion of said number n $(n_m, n_{m-1}, \ldots, n_1)$, and generating the i-th coordinate value $u_n^{(i)}$ of an n-th element of the low-discrepancy sequence by using said vector $v_n$ generated from the calculation result and a generator matrix $T_{(i)}$ ($1 \leq i \leq k$) and a matrix G $$G = \begin{bmatrix} 1 & -1 & & & \\ & 1 & -1 & & \\ & & \ddots & & \\ & & & 1 & -1 \\ & & & & 1 \end{bmatrix} \pmod{b}$$

(c) control means for inputting said n ($s \leq n \leq t$) and said generator matrix $T_{(i)}$ ($1 \leq i \leq k$) and said matrix G in said means (b) so that said means (b) generates a low-discrepancy sequence from the s-th element to the t-th element, wherein said s corresponds to said processing start number, and said t corresponds to a processing terminate number in the relevant processor, and s-th element of the low-discrepancy sequence is $(u_s^{(1)}, \ldots, u_s^{(k)})$, and t-th element of the low-discrepancy sequence is $(u_t^{(1)}, \ldots, u_t^{(k)})$.

16. A system for generating a low-discrepancy sequence, comprising: a plurality of processors; and means for transmitting a number n necessary for processing to each of said processors; wherein each of said processors comprises:

(a) means for receiving said number n; and (b) means for calculating a b scale expansion of said number n $(n_m, n_{m-1}, \ldots, n_1)$, and generating an n-th element of the low-discrepancy sequence $Y_n$ by using said vector $v_n$ generated from the calculation result and a generator matrix T stored in advance and a matrix G $$G = \begin{bmatrix} 1 & -1 & & & \\ & 1 & -1 & & \\ & & \ddots & & \\ & & & 1 & -1 \\ & & & & 1 \end{bmatrix} \pmod{b}$$

17. A system for calculating a multiple integral of a function f, comprising: a plurality of processors; and system control means for transmitting a function $f(x_1, x_2, \ldots, X_k)$ related to k elements and processing assignment information including a processing start number s to each of said processors; wherein each of said processors comprises:

(a) means for receiving said processing assignment information;

(b) means for calculating a b scale expansion of said number n $(n_m, n_{m-1}, \ldots, n_1)$, and creating an i-th coordinate value $u_n^{(i)}$ of an n-th element of the low-discrepancy sequence by using said vector $v_n$ generated from the calculation result and a generator matrix $T^{(i)}$ ($1 \leq i \leq k$) and a matrix G $$G = \begin{bmatrix} 1 & -1 & & & \\ & 1 & -1 & & \\ & & \ddots & & \\ & & & 1 & -1 \\ & & & & 1 \end{bmatrix} \pmod{b}$$

(c) control means for inputting said number n ($s \leq n \leq t$) and said generator matrix $T^{(i)}$ ($1 \leq i \leq k$) and said matrix G to said means (b) so that said means (b) generates a low-discrepancy sequence from the s-th element to the t-th element, wherein said s corresponds to said processing start number, and said t corresponds to a processing terminate number in the relevant processor, and the s-th element of the low-discrepancy sequence is $(u_s^{(1)}, \ldots, u_s^{(k)})$, and the t-th element of the low-discrepancy sequence is $(u_t^{(1)}, \ldots, u_t^{(k)})$;

(d) means for receiving said function f, and reading out each of value $u_n^{(i)}$ when the element of the low-discrepancy sequence $(u_n^{(1)}, \ldots, u_n^{(k)})$ is stored in said storage means, and calculating a value of $f(u_n^{(1)}, \ldots, u_n^{(k)})$;

(e) means for accumulating said created values of function $f(u_n^{(1)}, \ldots, u_n^{(k)})$ ($s \leq n \leq t$); and (f) means for transmitting the values accumulated by said means (e) to said system control means;

while the system control means accumulates values transmitted from each said processor and divides the accumulated value by the number of low-discrepancy sequences created for all said processors.

\* \* \* \* \*